Jan. 2, 1923. 1,440,732.
L. GORNICK.
STUCCO TREATMENT OF HOUSES EMBODYING GLASS.
FILED NOV. 3, 1921.

Inventor
Louis Gornick
Attorneys

Patented Jan. 2, 1923.

1,440,732

UNITED STATES PATENT OFFICE.

LOUIS GORNICK, OF JOLIET, ILLINOIS.

STUCCO TREATMENT OF HOUSES EMBODYING GLASS.

Application filed November 3, 1921. Serial No. 512,536.

*To all whom it may concern:*

Be it known that I, LOUIS GORNICK, a citizen of the United States, residing at Joliet, in the county of Will and State of Illinois, have invented certain new and useful Improvements in Stucco Treatment of Houses Embodying Glass, of which the following is a specification.

This invention relates to building construction and more particularly to stucco walls for houses and the method of making the same.

The primary object of the invention is the provision of a stucco wall having irregular pieces of different colored glass dashed thereon in lieu of the ordinary pebbles or gravel now generally used for such work, which has been found to be impractical to a certain extent, inasmuch as the elements have a tendency to wash off the pebbles and the gravel and the same do not form a positive means for preventing the transmission of heat or cold. Further, the pebbles or gravel do not give a pleasing appearance but present a dull unattractive color.

A further object of the invention is the provision of a stucco wall having glass fragments dashed thereon to form an exterior coating, so as to form an outer skin which will present a pleasing appearance, one that will be water and fire proof and one that will form a positive means for preventing the conducting of heat and cold.

Another object of the invention is the provision of an exterior coating for stucco walls formed of fragments of glass bottles, so that the said fragments will all be of an arcuate shape in cross section, so as to provide a positive means for permitting the effective anchoring thereof in the plaster forming the wall and so as to form means for allowing the reflection of high lights upon the building.

A still further object of the invention is the provision of a novel method for forming the stucco wall so as to insure that the entire surface thereof will be completely covered with the glass fragments and so that the loosening of the fragments or the disintegration of the wall will be prevented.

A still further object of the invention is the provision of a stucco wall having relatively large fragments of glass dashed thereon and relatively small fragments of glass dashed thereon, the relatively small pieces of glass being adapted to fill all of the spaces between the large fragments of the glass so as to form a continuous unbroken glass surface which will resist the elements and absolutely prevent the transmission of heat and cold.

With these and other objects in view, the invention consists in the novel construction, arrangement and formation of parts, as will be hereinafter more specifically described, claimed and illustrated in the accompanying drawings, forming a part of this specification, in which drawings:

Figure 1:
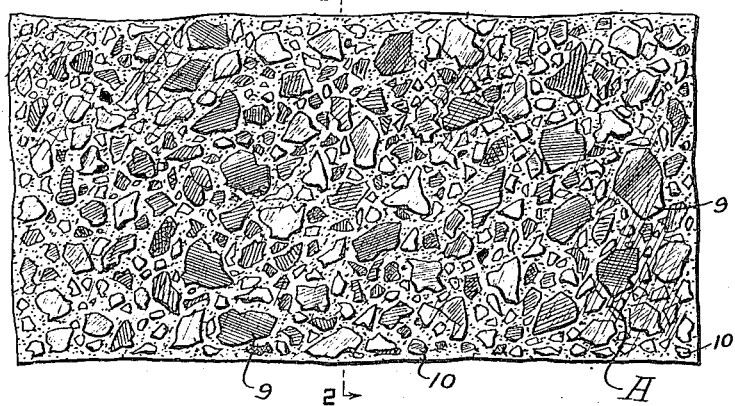
Figure 1 is a fragmentary elevation of a stucco wall constructed in accordance with the invention.
Figure 2:
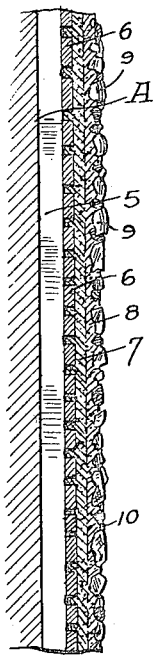
Figure 2 is a section through the wall taken on the line 2—2 of Figure 1.
Figure 3:
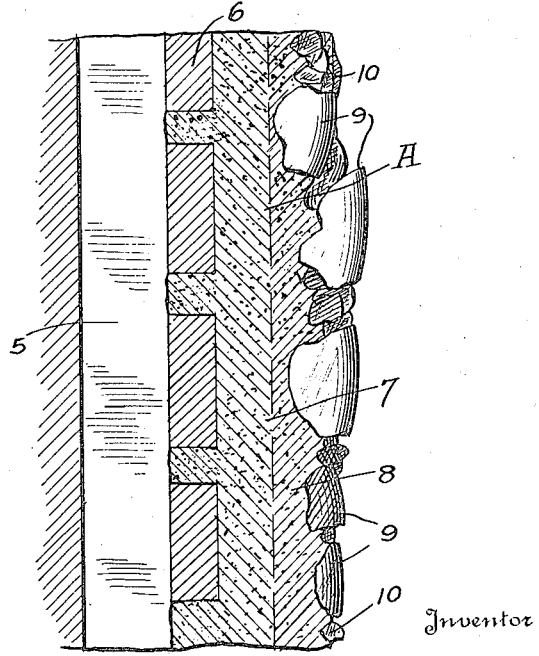
Figure 3 is an enlarged fragmentary section through the improved stucco wall showing the arrangement of the relatively large and relatively small fragments of glass in order to form an unbroken surface of glass fragments.

Referring to the drawings in detail, wherein similar reference characters designate corresponding parts throughout the several views, the letter A indicates a stucco wall constructed in accordance with the invention. The wall proper is constructed in the usual or any preferred manner and is indicated by the numeral 5. The outer face of this wall has secured thereto plaster laths, stucco boarding or screening. As shown laths 6 are secured to the outer surface of the wall proper 5. After the lathing has been placed in position two coats of plaster 7 and 8 are applied at different times to the outer face of the lathing, and the plaster has then dashed thereon the glass fragments 9 and 10. The glass fragments 9 are relatively large while the glass fragments 10 are relatively small, the purpose of which will be hereinafter more fully described.

All of the glass fragments are formed from different colored bottles and these different colored pieces of glass will present a novel and attractive appearance. Further by having the fragments of glass formed from glass bottles, all of the said fragments will be arcuate in cross section, permitting the ready anchoring thereof into the plaster and allowing an unbroken polished surface for the reflection of high lights.

The small particles of glass 10 are disposed intermediate the large fragments of glass 9 and are adapted to fill up the spaces intermediate the large glass fragments, so as to present an unbroken glass coating for the stucco wall.

In forming the stucco wall, the following improved method is followed out as the best result can be obtained therefrom.

The first coat 7, known as the scratch coat is mixed of the usual or any preferred ingredients, so as to readily work under the trowel. This coat is then applied on the laths 6 about one quarter of an inch thick. This is trowelled down to an even surface and brushed to make scratches on the outer surface thereof so that the second coat 8 will readily adhere thereto. The second coat 8 is mixed in the same manner as the first coat 7 with the inclusion of the dry material white coat. This mixture is then applied over the first coat about a quarter of an inch thick and trowelled down.

The glass fragments 9 and 10 are then taken and screened so as to grade the same into the large fragments and into the relatively small fragments. While the outer coat 8 is still wet, the large fragments of the glass, which are preferably dry are taken and dashed evenly on the coat 8 with sufficient force to make the same adhere to the said coat. A dry trowel is then taken and the fragments of glass are pushed straight in a sufficient distance to embed the same in the plaster.

The small fragments of glass 10 are then heated and dashed over the first coat of glass with sufficient force to make the same adhere to the plaster intermediate the relatively large fragments 9. This makes a substantial surface, and the heat from the small particles of glass dries the spaces between the large pieces of glass and thus firmly binds the whole coating of glass together to form a monolithic surface.

If desirable, a clean trowel can be drawn over the finished surface.

The glass fragments can be obtained in any manner, such as by buying up broken glass bottles or taking and sifting the débris from city streets.

The wall formed in the above described manner will not only be durable but will present a pleasing and attractive appearance and effectively keep out both heat and cold from the house.

Changes in details may be made without departing from the spirit or scope of this invention; but,

I claim:

1. A stucco wall comprising a coat of plaster and an outer coat of different colored arcuate glass fragments.

2. A stucco wall comprising an inner coat of plaster, an outer coat of glass fragments, certain of said glass fragments being relatively large and arcuate shaped in cross section, certain of the fragments being relatively small, the relatively small fragments being interposed between the relatively large fragments to fill up the spaces intermediate the large fragments.

3. A stucco wall comprising a base coat of plaster, an outer coat formed of glass fragments, said glass fragments being of arcuate shape in cross section and having their convex surfaces disposed outermost.

LOUIS GORNICK.